(12) United States Patent
Trinh et al.

(10) Patent No.: US 8,777,088 B2
(45) Date of Patent: Jul. 15, 2014

(54) METHODS FOR ATTACHING CUTTING ELEMENTS TO EARTH-BORING TOOLS USING TAPERED SURFACES

(75) Inventors: Tu Tien Trinh, Houston, TX (US); Eric C. Sullivan, Houston, TX (US); Xiaomin Chris Cheng, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 13/619,300

(22) Filed: Sep. 14, 2012

(65) Prior Publication Data

US 2013/0098972 A1 Apr. 25, 2013

Related U.S. Application Data

(60) Provisional application No. 61/535,627, filed on Sep. 16, 2011.

(51) Int. Cl.
*B23K 1/06* (2006.01)
*B23K 35/12* (2006.01)
*A01B 15/00* (2006.01)

(52) U.S. Cl.
USPC .................. 228/111.5; 228/254; 172/432

(58) Field of Classification Search
USPC .......... 172/432; 228/245, 253, 254, 255, 228/110.1–111.5, 1.1
See application file for complete search history.

(56) References Cited

U.S. PATENT DOCUMENTS

| | | | | |
|---|---|---|---|---|
| 3,683,470 A | * | 8/1972 | McMaster et al. | 29/33 K |
| 3,749,190 A | * | 7/1973 | Shipman | 175/426 |
| 4,047,583 A | * | 9/1977 | Dyer | 175/426 |
| 4,109,737 A | * | 8/1978 | Bovenkerk | 175/430 |
| 4,156,329 A | * | 5/1979 | Daniels et al. | 51/295 |
| 4,453,605 A | * | 6/1984 | Short, Jr. | 175/433 |
| 4,529,048 A | * | 7/1985 | Hall | 175/432 |
| 4,539,018 A | * | 9/1985 | Whanger et al. | 51/295 |
| 4,711,144 A | * | 12/1987 | Barr et al. | 76/108.2 |
| 4,752,266 A | * | 6/1988 | Vrijssen | 445/44 |
| 4,873,895 A | * | 10/1989 | Taylor et al. | 76/108.2 |
| 4,956,238 A | * | 9/1990 | Griffin | 428/408 |
| 5,060,739 A | * | 10/1991 | Griffin | 175/432 |

(Continued)

FOREIGN PATENT DOCUMENTS

JP 63188483 A * 8/1988 ............. B23K 20/10

OTHER PUBLICATIONS

International Search Report for International Application No. PCT/US2012/055377 dated Feb. 21, 2013, 3 pages.

*Primary Examiner* — Kiley Stoner
*Assistant Examiner* — Carlos Gamino
(74) *Attorney, Agent, or Firm* — TraskBritt (57) ABSTRACT

Methods of attaching cutting elements to earth-boring tools, comprising abutting a portion of a cutting element against at least one surface of an earth-boring tool with a braze material disposed therebetween; and brazing the cutting element to the earth-boring tool by applying high-frequency vibrations to cause the braze material to become flowable. Methods of securing cutting elements to earth-boring tools may comprise at least partially coating a cutting element with a braze material. The cutting element may be at least partially disposed in a pocket formed in a body of an earth-boring tool with the braze material adjacent surfaces defining the pocket. The cutting element and the braze material may be ultrasonically torsionally oscillated to braze the cutting element within the pocket.

14 Claims, 5 Drawing Sheets

(56) References Cited

U.S. PATENT DOCUMENTS

| | | | |
|---|---|---|---|
| 5,271,785 A * | 12/1993 | Devine | 156/73.2 |
| 5,299,726 A * | 4/1994 | Sauer | 228/111.5 |
| 5,469,927 A * | 11/1995 | Griffin | 175/432 |
| 5,921,460 A * | 7/1999 | Topping et al. | 228/111.5 |
| 6,019,271 A * | 2/2000 | Hayden et al. | 228/110.1 |
| 6,299,051 B1 * | 10/2001 | Tsujino | 228/110.1 |
| 6,772,849 B2 * | 8/2004 | Oldham et al. | 175/433 |
| 6,802,920 B2 * | 10/2004 | Shinohara et al. | 156/73.1 |
| 7,748,101 B2 * | 7/2010 | Williamson | 29/521 |
| 8,074,869 B2 * | 12/2011 | Lyons et al. | 228/234.3 |
| 2004/0169065 A1 | 9/2004 | Caspar et al. | |
| 2009/0078470 A1 | 3/2009 | Lyons et al. | |
| 2009/0173548 A1 | 7/2009 | Voronin et al. | |
| 2010/0187020 A1 | 7/2010 | Zhang et al. | |

* cited by examiner

METHODS FOR ATTACHING CUTTING ELEMENTS TO EARTH-BORING TOOLS USING TAPERED SURFACES

CROSS-REFERENCE TO RELATED APPLICATION

This application claims the benefit of U.S. Provisional Patent Application Ser. No. 61/535,627, filed Sep. 16, 2011, the disclosure of which is hereby incorporated herein in its entirety by this reference.

TECHNICAL FIELD

Embodiments of the disclosure relate generally to methods for attaching cutting elements to earth-boring tools and methods of forming cutting elements for earth-boring tools. Specifically, disclosed embodiments relate to methods of securing cutting elements to earth-boring tools using a high-frequency brazing process and resulting products.

BACKGROUND

Earth-boring tools for forming wellbores in subterranean earth formations may include a plurality of cutting elements secured to a body include, such as, for example, fixed-cutter earth-boring rotary drill bits (also referred to as "drag bits"). Such fixed-cutter bits include a plurality of cutting elements that are fixedly attached to a bit body of the drill bit, conventionally in pockets formed in blades and other exterior portions of the bit body. Other earth-boring tools may include rolling cone earth-boring drill bits, which include a plurality of roller cones attached to bearing pins on legs depending from a bit body. The roller cones may include cutting elements (sometimes called "inserts") attached to the roller cones, conventionally in pockets formed in the roller cones.

Brazing is widely used to join cutting elements to such earth-boring tools and components of such earth-boring tools by means of a braze material (e.g., a filler material) that melts upon heating and coats the surface of materials being joined, creating a bond upon cooling and solidification of the braze material. A suitable braze material wets the surfaces of the materials being joined and allows the materials to be joined without changing the physical properties of the materials. Braze materials are conventionally selected to melt at a lower temperature than a melting temperature or temperatures of the materials being joined. During a brazing process, heating and cooling of the materials may take place in the open atmosphere or in a controlled atmosphere furnace or vacuum furnace. Braze materials are often based on metals such as Ag, Au, Cu, Ni, Ti, Pd, Pt, Cr, and alloys thereof. Braze base materials may also include fractions of a wide variety of other elements that are added to vary the properties of the resulting alloy. Brazing can be used effectively to join similar or dissimilar materials (e.g., metals to metals, ceramics to ceramics, and metals to ceramics).

Typically, in a brazing process a filler metal or alloy is heated to a melting temperature above 800° F. (427° C.) and distributed between two or more close-fitting parts by direct placement of the filler material between the parts, or drawn into an interface between the parts by capillary action. At the melting temperature of a braze material, the molten braze material interacts with the surfaces of the parts, cooling to form a strong, sealed joint. A brazed joint may thus become a sandwich of different layers, each layer metallurgically linked to one or more adjacent layers.

Brazing cutting elements to an earth-boring tool may cause individual cutting elements to have final orientations that are offset from intended orientations of the cutting elements due to human error in applying the braze, non-uniform application of the braze material, and distortion of the components to which the cutting elements are attached. In addition, brazing may require preheating the body of the earth-boring tool, and application of specialized brazing environments (e.g., controlled atmospheres), which may be expensive, time-consuming, and may potentially warp portions of the bit beyond acceptable tolerances.

BRIEF SUMMARY

Some embodiments may comprise methods of attaching cutting elements to earth-boring tools, comprising abutting a portion a cutting element against at least one surface of an earth-boring tool with a braze material disposed therebetween; and brazing the cutting element to the earth-boring tool by applying high-frequency vibrations to cause the braze material to become flowable.

In other embodiments, methods of securing cutting elements to earth-boring tools may comprise at least partially coating a cutting element with a braze material. The cutting element may be at least partially disposed in a pocket formed in a body of an earth-boring tool with the braze material adjacent surfaces defining the pocket. The cutting element and the braze material may be ultrasonically torsionally oscillated to braze the cutting element within the pocket.

BRIEF DESCRIPTION OF THE DRAWINGS

While the specification concludes with claims particularly pointing out and distinctly claiming what are regarded as embodiments of the present invention, various features and advantages of example embodiments may be more readily ascertained from the following description when read in conjunction with the accompanying drawings, in which:

DETAILED DESCRIPTION

The illustrations presented herein are not meant to be actual views of any particular cutting element, earth-boring tool, or component thereof, but are merely idealized representations that are employed to describe example embodiments. Thus, the drawings are not necessarily to scale and relative dimensions may have been exaggerated or understated for the sake of clarity. Additionally, elements common between figures may retain the same or similar numerical designation.

Disclosed embodiments relate to cutting elements secured to earth-boring tools. More specifically, disclosed embodiments relate to cutting elements that are subsequently secured to earth-boring tools using a high-frequency brazing technique, and related methods.

The terms "earth-boring tool" and "earth-boring drill bit," as used herein, mean and include any type of bit or tool used for drilling during the formation or enlargement of a wellbore in a subterranean formation and include, for example, fixed-cutter bits, rolling cone bits, impregnated bits, core bits, eccentric bits, bicenter bits, and hybrid bits as well as reamers, mills, and other drilling bits and tools known in the art.

As used herein, the term "polycrystalline material" means and includes any structure comprising a plurality of grains (i.e., crystals) of material (e.g., superhard material) that are bonded directly together by inter-granular bonds. The crystal structures of the individual grains of the material may be randomly oriented in space within the polycrystalline material.

As used herein, the terms "inter-granular bond" and "inter-bonded" mean and include any direct atomic bond (e.g., covalent, metallic, etc.) between atoms in adjacent grains of superabrasive material.

As used herein, the term "superhard material" means and includes any material having a Knoop hardness value of about 3,000 Kg/mm$^2$ (29,420 MPa) or more. Superhard materials include, for example, diamond and cubic boron nitride. Superhard materials may also be characterized as "superabrasive" materials.

As used herein, the term "tungsten carbide" means and includes any material composition that contains chemical compounds of tungsten and carbon, such as, for example, WC, $W_2C$, and combinations of WC and $W_2C$. Tungsten carbide includes, for example, cast tungsten carbide, sintered tungsten carbide, and macrocrystalline tungsten carbide.

As used herein, the term "diamond" means and includes any material composition that contains an allotrope of carbon wherein the carbon atoms are arranged in a diamond lattice structure, typically characterized by a tetrahedral bond structure. Diamond includes, for example, natural and synthetic diamonds and polycrystalline and monocrystalline diamond.

As used herein, the terms "catalyst" and "catalyst material" mean and include any material capable of catalyzing growth of diamond grains and formation of intergranular bonds among diamond grains. Typical catalyst materials include materials selected from Group VIIIB of the Periodic Table of the Elements, such as, for example, cobalt, nickel, iron, and alloys and mixtures of such materials.

As used herein, the term "braze material" means and includes any material for attaching two or more adjacent parts to one another by flowing (e.g., wetting) the braze material. Example, non-limiting braze materials include, for example, aluminum, copper, gold, silver, nickel, silicon, boron, phosphorous, and alloys, as well as compounds, and combinations of such materials. Particularly suitable braze materials may comprise copper, silver, or a copper/silver alloy, which materials exhibit relatively low melting temperatures. Temperatures for brazing may be above the melting (i.e., liquidus) temperature of the braze material and below the melting temperature or temperatures of the parts to be joined together. For example, brazing may occur at temperatures exceeding 800° F. (427° C.).

Figure 1:
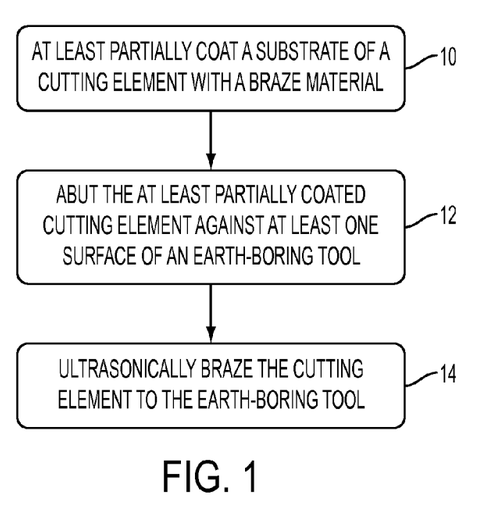
FIG. 1 is a schematic showing acts in a process of attaching a cutting element to an earth-boring tool.

FIG. 1 is a schematic showing acts in a process of attaching a cutting element to an earth-boring tool. As reflected at 10, a substrate of a cutting element may be at least partially coated with a braze material. As shown at 12, at least a portion of the at least partially coated cutting element may abut at least one surface of an earth-boring tool. As depicted at 14, the at least partially coated cutting element may be ultrasonically brazed to the earth-boring tool. Alternatively, a braze material may be disposed on a portion of the earth-boring tool to which the cutting element is to be secured. Such acts, in addition to other acts that may be performed when attaching a cutting element to an earth-boring tool, are described in more detail with reference to the following drawings.

Figure 2:
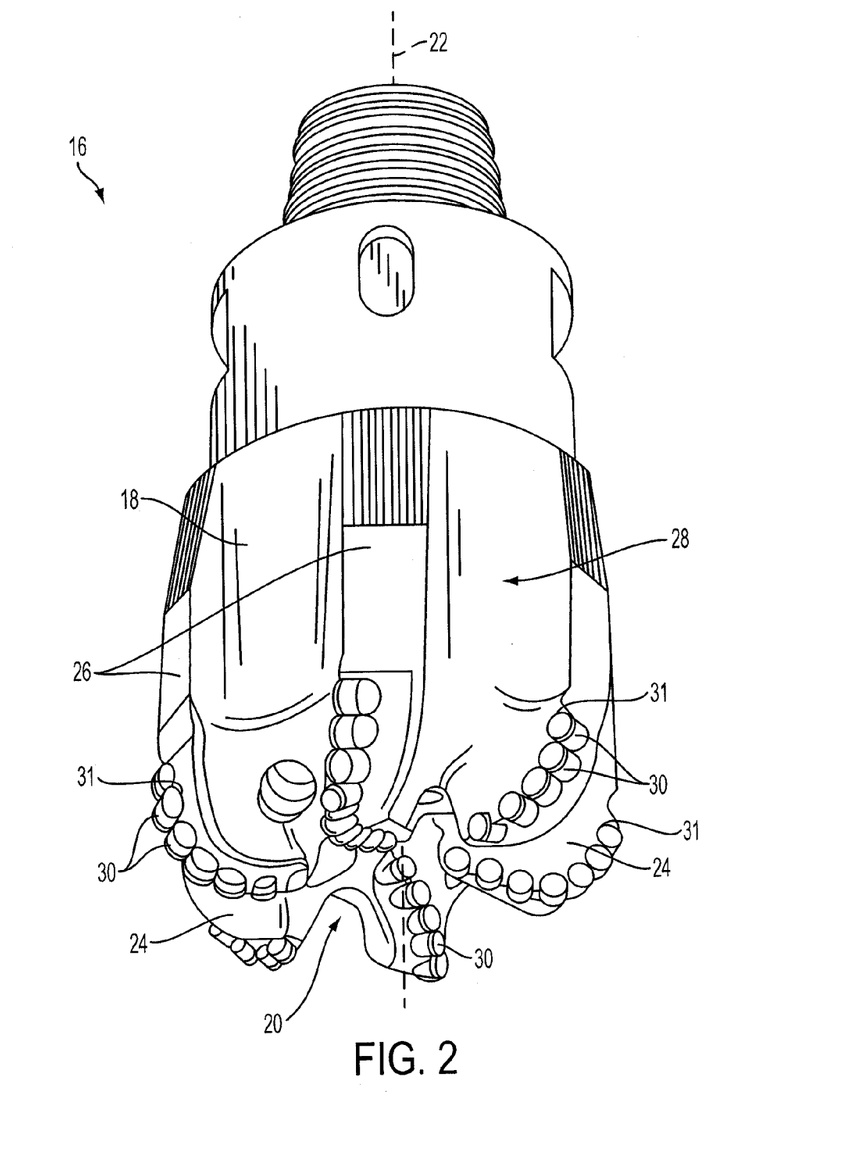
FIG. 2 is a perspective view of an earth-boring drill bit.

Referring to FIG. 2, a perspective view of an earth-boring tool in the form of an earth-boring drill bit 16 is shown. The earth-boring drill bit 16 includes a bit body 18 having a face 20 at a leading end of the earth-boring drill bit 16 and a longitudinal axis 22 (e.g., an axis of rotation, an axis of rotational symmetry, or an axis along a geometric center) extending through the bit body 18. Blades 24 may extend longitudinally downward from the face 20 and radially outward over the face 20. In other words, the blades 24 may comprise protrusions from the face 20 that extend outward, like spokes of a wheel, over the face 20. The blades 24 may extend longitudinally upward away from the face 20 to a gage region 26, which may define an outermost diameter of the earth-boring drill bit 16. Junk slots 28 may be formed by the spaces defined between adjacent blades 24, and cuttings may be carried away from the face 20 through the junk slots 28 as the earth-boring drill bit 16 is rotated in a borehole. Though the earth-boring drill bit 16 is shown as having six blades 24, any number of blades 24 may extend from the face 20. Cutting elements 30 may be fixedly attached to the blades 24. More specifically, the cutting elements 30 may be secured within pockets 31 formed in the blades 24. The cutting elements 30 may be configured to engage and remove an underlying earth formation primarily through a shearing or scraping cutting mechanism. In other embodiments, cutting elements may be attached to other earth-boring tools or components of earth-boring tools, such as, for example, to roller cones of rolling cone drill bits or to blades of reamers.

Figure 3:
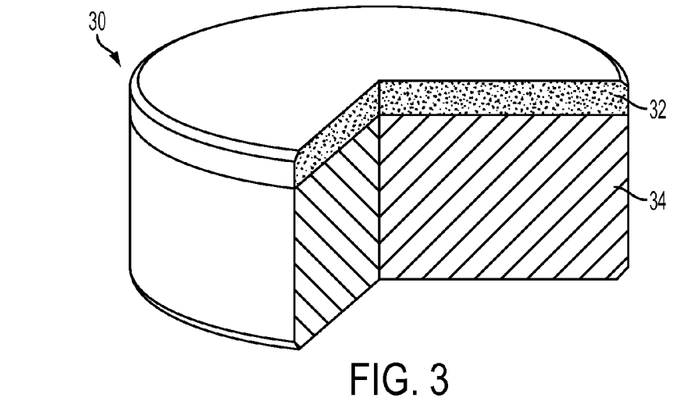
FIG. 3 is a partial cutaway perspective view of a cutting element.

Referring to FIG. 3, a partial cutaway perspective view of a cutting element 30 that may be attached to an earth-boring tool is shown. The cutting element 30 includes a polycrystalline table 32 secured to an end of a substrate 34. The cutting element 30 may be generally cylindrical in shape. Accordingly, the polycrystalline table 32 may be shaped as a disc or circular wafer of material and the substrate 34 may be at least substantially cylindrical in shape. In other embodiments, the cutting element 30 may have other shapes known in the art, such as, for example, dome-tipped, chisel-shaped, tombstone, etc. The polycrystalline table 32 may be formed of a polycrystalline superhard material. For example, the polycrystalline table 32 may comprise polycrystalline diamond, polycrystalline cubic boron nitride, polycrystalline carbon nitride, or other superhard polycrystalline materials known in the art. Catalyst material may be disposed in interstitial spaces among interbonded grains of superhard material in some embodiments. In other embodiments, catalyst material used in the formation of the polycrystalline table 32 may be completely or partially removed from at least a portion of the polycrystalline table 32. The substrate 34 may be formed of a ceramic-metallic composite material (i.e., a cermet material), which may comprise ceramic hard phase particles in a metal matrix. For example, the substrate 34 may comprise cobalt-cemented tungsten carbide.

Such a cutting element 30 may be formed using a conventional high-temperature/high-pressure (HTHP) process. Briefly, an HTHP process may involve exposing grains of superhard material to elevated temperatures and pressures in the presence of a catalyst material to interbond the grains of superhard material to one another. Temperatures may exceed 1320° C., and pressures may exceed 4 GPa, 7 GPa, or may be even greater than 8 GPa. Catalyst may infiltrate the polycrystalline table 32 from the substrate 34. Thus, the polycrystalline table 32 may be formed and concurrently secured to an end of the substrate 34.

Figure 4A:
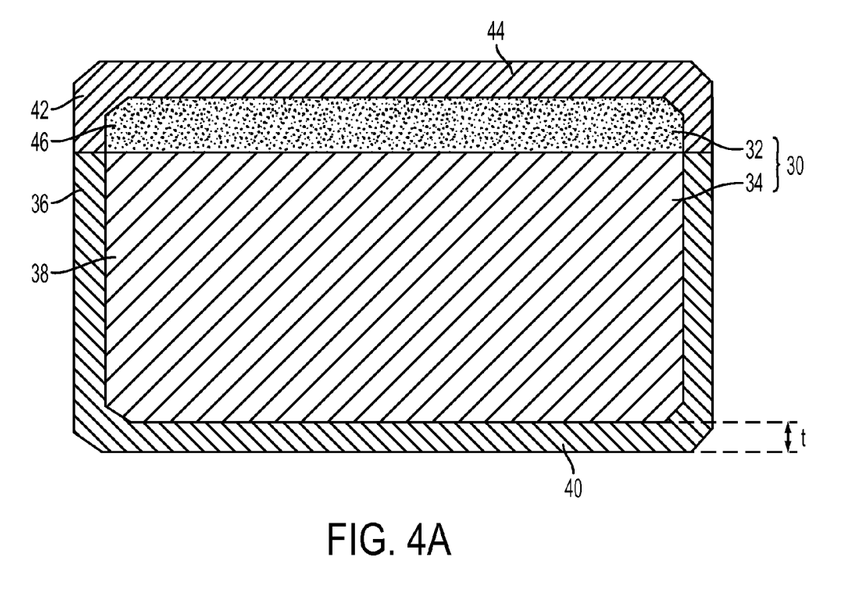
FIGS. 4A through 4C are side cross-sectional views cutting elements after at least partial coating with a braze material.

Referring to FIG. 4A, a side cross-sectional view of the cutting element 30 of FIG. 3 after partial coating with a braze material 36 is depicted. The braze material 36 may at least substantially cover the substrate 34 of the cutting element 30. For example, the braze material 36 may form a continuous coating covering sidewalls 38 of the substrate 34 around the entire circumference of the substrate 34 and a back end surface 40 of the substrate 34 opposing the polycrystalline table 32. The braze material 36 may not cover the polycrystalline table 32, as shown in FIG. 4. In other embodiments, the braze material 36 may completely cover the cutting element 30, including the polycrystalline table 32 and the substrate 34. In still other embodiments, the braze material 36 may only cover a portion of the substrate 34, such as, for example, the back end surface 40 of the substrate 34 opposing the polycrystalline table 32 and a portion of the sidewalls 38 extending from the back end surface 40 of the substrate 34 opposing the polycrystalline table 32 to an intermediate portion of the substrate 34 (i.e., a portion of the substrate 34 between the polycrystalline table 32 and the back end surface 40 of the substrate 34). In other words, a portion of the substrate 34 may be exposed or may be covered by a material other than the braze material 36.

The braze material 36 may be deposited on at least a portion of the substrate 34 and, optionally, on the polycrystalline table 32. For example, the braze material 36 may be electroplated onto the substrate 34 and optionally onto the polycrystalline table 32 in some embodiments. In other embodiments, the braze material 36 may be deposited on the substrate 34 and optionally on the polycrystalline table 32 by a vapor deposition process, such as, for example, a chemical vapor deposition (CVD) process, a plasma-enhanced chemical vapor deposition (PECVD) process, an atomic layer deposition (ALD) process, a physical vapor deposition (PVD) process (e.g., sputtering), by thermal spraying (e.g., a high velocity oxygen fuel (HVOF) spraying process), or by dipping at least a portion of the cutting element 30 in molten braze material 36. In further embodiments, the braze material 36 may comprise a foil wrapped about the circumference of the substrate 34.

In some embodiments, protective material 42 may be deposited over at least a portion of the cutting element 30 prior to deposition of the braze material. The protective material 42 may be deposited over the cutting face 44 and sidewalls 46 of the polycrystalline table 32 and terminate at the interface between the polycrystalline table 32 and the substrate 34, as shown in FIG. 4A. In other embodiments, the protective material 42 may not extend down the sidewalls 46 of the polycrystalline table 32, may extend beyond the interface along the sidewalls 38 of the substrate 34, or may be deposited only on the sidewalls 46 of the polycrystalline table 32 and optionally on the sidewalls 38 of the substrate 34. The protective material 42 may prevent braze material 36 from depositing onto the portion of the cutting element 30 that is covered by the protective material 42. Protective materials 42 may include, for example, dielectric materials, ceramics, polymers, and other materials that may inhibit deposition of the braze material 36 onto portions of the cutting element 30. In embodiments where no protective material 40 is deposited onto the cutting element 30, braze material 36 may not be deposited on a portion of the cutting element 30 due to control of the deposition or other application process used to place the braze material 36. For example, only a portion of the cutting element 30 may be submerged in an electrolyte such that braze material 36 is electroplated only on the submerged portion.

A thickness t of the braze material 36 after the deposition process is complete may be at least substantially uniform in some embodiments. For example, the at least substantially uniform thickness t of the braze material 36 after deposition may be between about 0.002 in (50.8 μm) and about 0.004 in (101.6 μm). In other embodiments, the thickness t of the braze material 36 after deposition may vary. For example, the non-uniform thickness t of the braze material 36 after deposition may vary between about 0.002 in (50.8 μm) and about 0.004 in (101.6 μm).

Figure 4B:
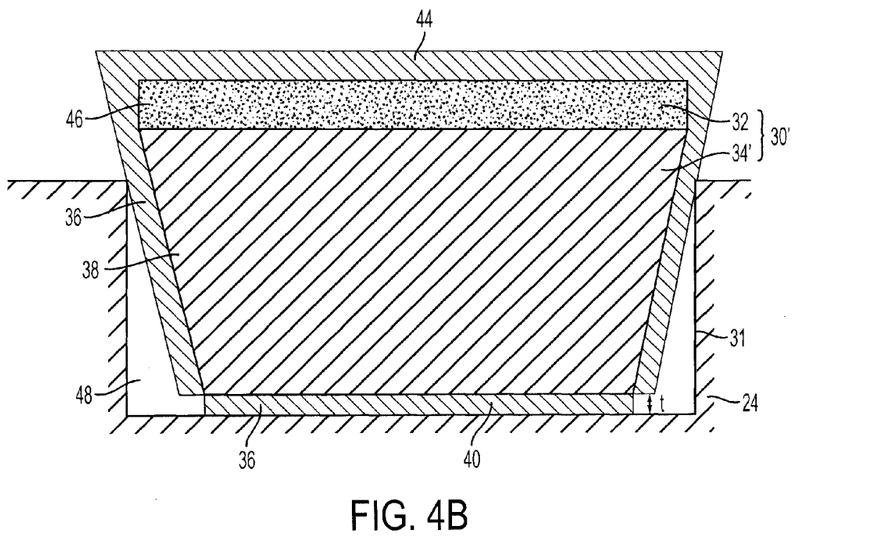

Referring to FIG. 4B, a side cross-sectional view of another embodiment of a cutting element 30' after partial coating with a braze material 36 and after disposal in a pocket 31 formed in, for example, a blade 24 of an earth-boring drill bit 16 (see FIG. 2) is shown. The substrate 34' may be tapered (such taper being shown in exaggerated form in FIG. 4B for clarity) such that a circumference of the substrate 34' at the interface with the polycrystalline table 32 is greater than the circumference of the substrate 34' at the back end surface 40. For example, the substrate 34' may exhibit a frustoconical shape. The braze material 36 may be deposited with an at least substantially uniform thickness t around the entire cutting element 30'. Thus, the braze material 36 may conform to the taper of the cutting element 30'.

A gap 48 (e.g., a space or void) may remain between the braze material 36 and surfaces of the pocket 31 due to the taper of the substrate 34'. For example, the gap 48 may increase in size as distance from the polycrystalline table 32 increases. In addition, the braze material 36 may be discontinuous. For example, discontinuities in the otherwise continuous braze material 36 may be formed round the circumferential edge of the back end surface 40 of the substrate 34'. Thus, the discontinuities in the braze material 36 may further increase the size of the gap 48 proximate the back end surface 40 of the substrate 34'. When the braze material 36 is melted and flows to join the cutting element 30' to the blade 24 within the pocket 31, the taper of the substrate 34' may cause the braze material 36 to flow into the gap 48. Thus, a final thickness t of the braze material 36 after brazing is complete may be non-uniform despite the braze material 36 as applied to cutting element 30' having initially been of uniform thickness t. By deliberately introducing an initial gap between the cutting element 30' and the pocket 31 into which the liquefied braze material 36 may flow, the likelihood of inadvertent formation of voids such as may form during a conventional brazing process may be reduced.

Figure 4C:
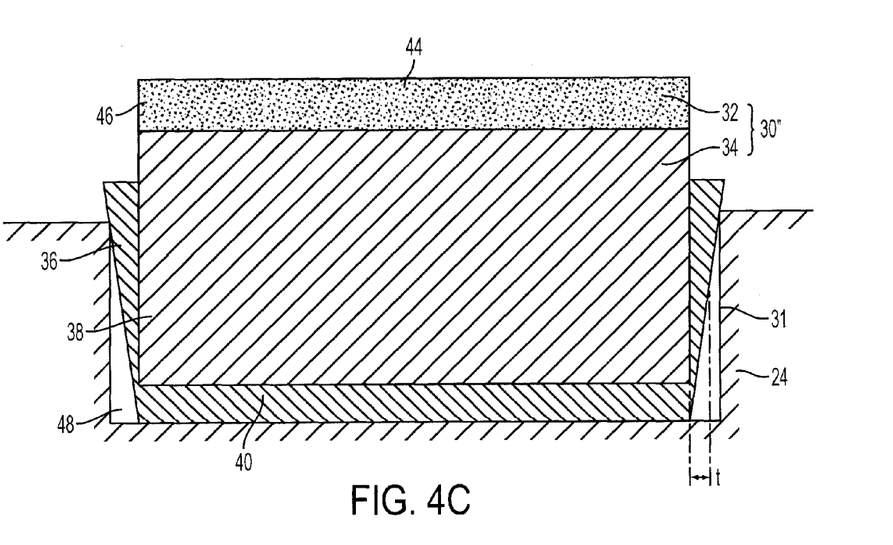

Referring to FIG. 4C, a side cross-sectional view of yet another embodiment of a cutting element 30" after partial coating with a braze material 36 and after disposition in a pocket 31 formed in a blade 24 of an earth-boring drill bit 16 (see FIG. 2) is shown. The substrate 34 may be substantially cylindrical and may be partially coated with a braze material 36 having a non-uniform thickness t, such variation in thickness being exaggerated for clarity in FIG. 4C. For example, a thickness t of the braze material 36 on the sidewalls 38 of the substrate 34 proximate the polycrystalline table 32 may be greater than the thickness t of the braze material 36 on the sidewalls 38 of the substrate 34 at the back end surface 40. In other words, the braze material 36 may form a frustoconical shell partially surrounding the substantially cylindrical substrate 34.

A gap 48 (e.g., a space or void) may remain between the braze material 36 and surfaces of the pocket 31 due to the varying thickness t of the braze material 36. For example, the gap 48 may increase in size as distance from the polycrystalline table 32 increases. When the braze material 36 is flowed to join the cutting element 30 to the blade 24 within the pocket 31, the taper of the braze material 36 may cause the braze material 36 to flow into the gap 48. Thus, a final thickness t of the braze material 36 after brazing is complete may be uniform despite the braze material 36 having initially been of non-uniform thickness t. By deliberately introducing an initial gap between the cutting element 30 and the pocket 31 into which the liquefied braze material 36 may flow, the likelihood of inadvertent formation of voids such as may form during conventional brazing may be reduced.

Figure 5:
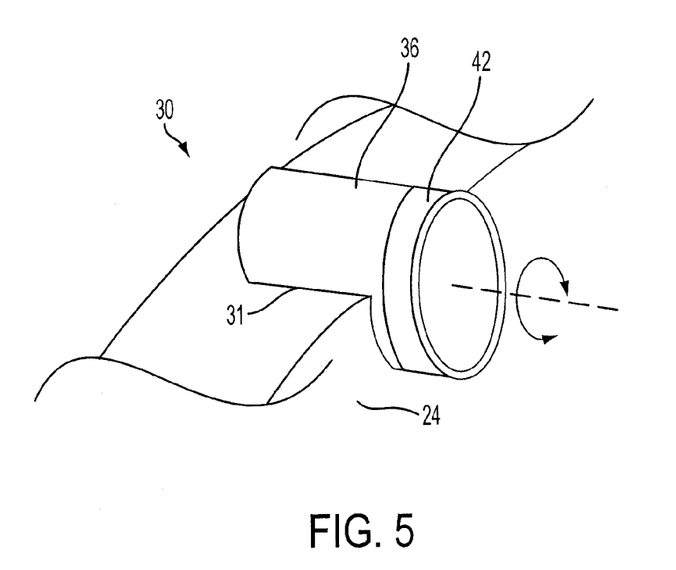
FIG. 5 is a perspective view of the cutting element of FIG. 4 adjacent a portion of an earth-boring drill bit.

Referring to FIG. 5, a perspective view of the cutting element 30 of FIG. 4A adjacent a portion of an earth-boring tool is shown. More specifically, portions of the cutting element 30 that are covered with the braze material 36 may abut surfaces of the earth-boring tool to which the cutting element 30 is to be secured. For example, the cutting element 30 may be positioned in a pocket 31 formed in a blade 24 of an earth-boring drill bit 16 (see FIG. 2) such that at least some of the braze material 36 abuts surfaces of the pocket 31. More specifically, the braze material 36 may abut surfaces of the pocket 31 facing the sidewalls 38 of the substrate 34 and facing the back end surface 40 of the substrate 34 (see FIGS. 4B and 4C). In some embodiments, a gap 48 may be present between portions of the braze material 36 and surfaces of the pocket 31 (see FIGS. 4B and 4C).

The cutting element 30 may be secured within the pocket 31 by brazing. For example, the cutting element 30 and the braze material 36 deposited on the cutting element 30 may be oscillated at one or more high, for example, ultrasonic frequencies within the pocket 31 to cause the braze material 36 to liquefy and flow, wetting the cutting element 30 and the surfaces of the pocket 31, filling gaps 48 in the pocket 31, and joining the cutting element 30 to the blade 24 within the pocket 31 upon subsequent resolidification of the braze material 36. Such a process may be referred to as ultrasonic brazing. More specifically, torsional ultrasonic vibrations may be applied to the cutting element 30 and the braze material 36, causing the cutting element 30 to oscillate rotationally, as indicated by the arrow in FIG. 5. For example, the Wiedemann effect exploited by a transducer may be used to impart ultrasonic torsional oscillation to the cutting element 30 and the braze material 36 in a manner similar to oscillation of ultrasonic scalpels. As a specific, non-limiting example, ultrasonic torsional oscillation may be produced using a transducer similar to that used in the LOTUS™ ultrasonic scalpel system available from SRA Developments LTD., Brembridge, Ashburton, Devon, TQ13 7JX, UK.

The cutting element 30 and braze material 36 may be caused to rotate back and forth at one or more frequencies between about 10 kHz and about 10 MHz. More specifically, the cutting element 30 and braze material 36 may be caused rotate back and forth at one or more frequencies between about 10 kHz and about 100 kHz or between about 2 MHz and about 8 MHz. As specific, non-limiting examples, the cutting element 30 and braze material 36 may rotate back and forth at a frequency of about 25 kHz, about 50 kHz, about 75 kHz, or about 5 MHz. An amplitude of the rotational oscillations may be between about 1 µm and about 50 µm, as measured at a periphery of the cutting element 30 and braze material 36. More specifically, the amplitude of the rotational oscillations may be between about 10 µm and about 15 µm. As a specific, non-limiting example, the amplitude of the rotational oscillations may be about 12.5 µm.

Friction between the braze material 36 and surfaces of the pocket 31 may cause the braze material 36 to melt, wetting the cutting element 30 and the surfaces of the pocket 31, filling gaps 48 in the pocket 31, and joining the cutting element 30 to the blade 24 within the pocket 31 upon cooling and resolidification of the braze material 36. By way of non-limiting example, friction between the braze material 36 and the surfaces of the pocket 31 may cause the braze material 36, or at least a portion of the braze material 36, to reach temperatures exceeding 800° F. (427° C.). A duration of the rotational oscillations that may enable the cutting element 30 to be brazed within the pocket 31 may be between about 0.1 second and about 60 seconds. More specifically, the duration of the rotational oscillations to which the cutting element 30 and the braze material 36 may be subjected may be between about 10 seconds and about 30 seconds. As a specific, non-limiting example, the duration of the rotational oscillations to which the cutting element 30 and the braze material 36 may be subjected may be about 20 seconds. Ultrasonic brazing may result in a stronger, more consistent braze, and use of more desirable brazing techniques because the application process may enable smaller and more uniform quantities of braze material 36 to be used, may be amenable to automation, and may not require the use of open flames or high voltages. In addition, the ultrasonic vibrations may tend to "squeeze" the liquefied braze material into all portions of the gap 48 between cutting element 30 and the surfaces of pocket 31, displacing any air in the gaps 48 and disrupting the potential for void formation.

The bit body 18, the cutting element 30, or both may, optionally, be preheated so that the braze material 36 reaches its melting temperature more quickly in some embodiments. For example, the bit body 18, the cutting element 30, or both may be preheated to a temperature of between about 600° C. and about 1,250° C. More specifically, the bit body 18, the cutting element 30, or both may be preheated to a temperature of between about 600° C. and about 750° C. As specific, non-limiting examples, the bit body 18, the cutting element 30, or both or portions thereof to which cutting elements are to be secured may be preheated to a temperature of about 620° C., about 650° C., 700° C., or about 1,000° C. The bit body 18, the cutting element 30, or both may be preheated by, for example, induction, radio frequency (e.g., microwave) heating, or by convective heating. In other embodiments, the bit body 18, the cutting element 30, or both may not be preheated, and only the friction between the ultrasonically oscillating braze material 36 and the pocket 31 may cause the braze material 36 to reach its liquidus temperature. The ultrasonic brazing process may be performed in a vacuum environment in some embodiments. In other embodiments, the ultrasonic brazing process may be performed in a controlled atmosphere, such as, for example, in the presence of an inert gas (e.g., argon). In still other embodiments, the ultrasonic brazing process may be performed in unaltered, ambient atmospheric conditions.

Figure 6:
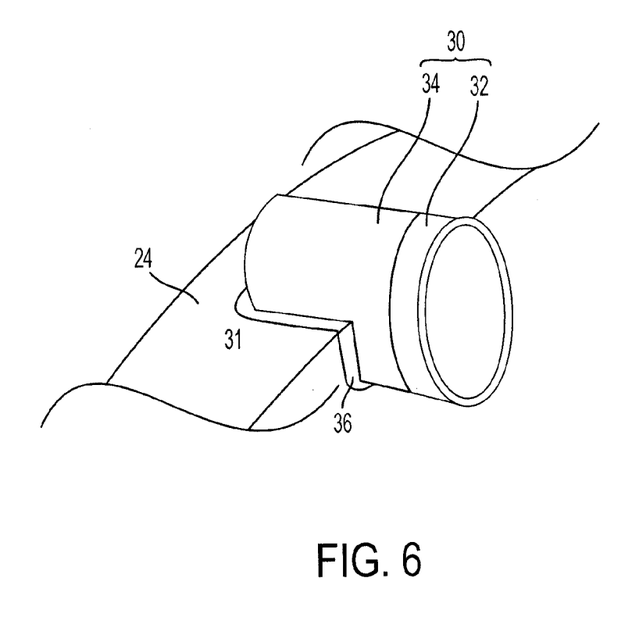
FIG. 6 is a perspective view of the cutting element of FIG. 5 after brazing to the earth-boring drill bit.

Referring to FIG. 6, a perspective view of the cutting element 30 of FIG. 5 after brazing to the earth-boring tool is shown. Once the braze material 36 has flowed and wetted the cutting element 30 and the surfaces of the pocket 31, filling gaps 48 (see FIGS. 4B and 4C) between the cutting element 30 and the pocket 31, the ultrasonic oscillation may cease and the bit body 18 (FIG. 2) may be cooled. Thus, the braze material 36 may resolidify and join the cutting element 30 to the blade 24 within the pocket 31. In addition to securing the cutting element 30 within the pocket 31, ultrasonic brazing may remove at least some surface oxides from the interface between the pocket 31 and the cutting element 30 and improve surface wettability of the braze material 36 to surfaces of the pocket 31.

Additional, non-limiting example embodiments may include the following:

Embodiment 1

A method of attaching a cutting element to an earth-boring tool, comprising: abutting a portion of a cutting element against at least one surface of an earth-boring tool with a braze material disposed therebetween; and brazing the cutting element to the earth-boring tool by applying high-frequency vibrations to cause the braze material to become flowable.

Embodiment 2

The method of Embodiment 1, wherein brazing the cutting element to the earth-boring tool comprises ultrasonically torsionally oscillating the cutting element and the braze material.

Embodiment 3

The method of Embodiment 2, wherein ultrasonically torsionally oscillating the cutting element and the braze material comprises ultrasonically oscillating the cutting element and the braze material at a frequency of between about 10 kHz and 100 kHz.

Embodiment 4

The method of Embodiment 2 or Embodiment 3, wherein ultrasonically torsionally oscillating the cutting element and the braze material comprises elevating a temperature of the braze material to a temperature above the liquidus temperature of the braze material.

Embodiment 5

The method of Embodiment 4, wherein elevating the temperature of the braze material to the temperature above the liquidus temperature of the braze material comprises elevating the temperature of the braze material above about 800° F. (427° C.).

Embodiment 6

The method of any one of Embodiments 2 through 5, wherein abutting the portion of the cutting element against the at least one surface of the earth-boring tool comprises placing the cutting element in a pocket formed in a blade of an earth-boring tool with braze material adjacent surfaces in the pocket.

Embodiment 7

The method of Embodiment 6, wherein abutting the portion of the cutting element with braze material adjacent surfaces in the pocket comprises forming a gap between at least a portion of the braze material and at least one surface in the pocket.

Embodiment 8

The method of Embodiment 7, wherein ultrasonically brazing the cutting element to the earth-boring tool comprises causing the braze material to flow into the gap.

Embodiment 9

The method of any one of Embodiments 1 through 8, further comprising preheating at least a portion of a body of the earth-boring tool to which the cutting element is to be attached to between about 600° C. and about 750° C.

Embodiment 10

The method of any one of Embodiments 1 through 9, wherein disposing the braze material between a portion of the cutting element and at least one surface of the earth-boring tool comprises at least partially coating the substrate of the cutting element with the braze material.

Embodiment 11

The method of Embodiment 10, further comprising completely covering a polycrystalline table secured to an end of the substrate with the braze material.

Embodiment 12

The method of Embodiment 10, wherein at least partially coating the substrate of the cutting element with the braze material comprises covering a back end surface of the substrate and a portion of a sidewall of the substrate with the braze material.

Embodiment 13

The method of Embodiment 12, further comprising covering at least a polycrystalline table secured to an end of the substrate opposing the back end surface with a protective material.

Embodiment 14

The method of any one of Embodiments 10 through 13, wherein at least partially coating the substrate of the cutting element with the braze material comprises electroplating the braze material onto at least a portion of the substrate.

Embodiment 15

The method of any one of Embodiments 2 through 14, wherein ultrasonically torsionally oscillating the cutting element and the braze material comprises ultrasonically torsionally oscillating the cutting element and the braze material at an amplitude of between about 1 μm and about 50 μm, as measured at a periphery of the cutting element and the braze material.

Embodiment 16

The method of any one of Embodiments 2 through 15, wherein ultrasonically torsionally oscillating the cutting element and the braze material comprises ultrasonically torsionally oscillating the cutting element and the braze material for a duration of between about 0.1 second and about 60 seconds.

Embodiment 17

A method of securing a cutting element to an earth-boring tool may comprise at least partially coating a cutting element with a braze material. The cutting element may be at least partially disposed in a pocket formed in a body of an earth-boring tool with the braze material adjacent surfaces defining the pocket. The cutting element and the braze material may be ultrasonically torsionally oscillated to braze the cutting element within the pocket.

Embodiment 18

The method of Embodiment 17, wherein at least partially disposing the cutting element in the pocket formed in the body of the earth-boring tool with the braze material adjacent surfaces defining the pocket comprises forming a gap between at least a portion of the braze material and at least one surface defining the pocket.

Embodiment 19

The method of Embodiment 18, wherein at least partially coating a cutting element with a braze material comprises at least partially coating the braze material at a uniform thickness onto a tapered surface of a substrate of the cutting element, the tapered surface being defined such that a circumference of the substrate at an interface with a polycrystalline table secured to the substrate is greater than the circumference of the substrate at a back end surface thereof, and wherein forming the gap between the at least a portion of the braze material and the at least one surface defining the pocket comprises forming the gap between a tapered surface of the braze material and the at least one surface defining the pocket.

Embodiment 20

The method of Embodiment 18, wherein at least partially coating a cutting element with a braze material comprises at least partially coating the braze material at a non-uniform thickness onto a surface of a substrate of the cutting element to form a tapered surface, the tapered surface of the braze material being defined such that a thickness of the braze material proximate a polycrystalline table secured to the substrate is greater than the thickness of the braze material at a back end surface of the substrate, and wherein forming the gap between the at least a portion of the braze material and the at least one surface defining the pocket comprises forming the gap between the tapered surface of the braze material and the at least one surface defining the pocket.

While the present disclosure has been described herein with respect to certain example embodiments, those of ordinary skill in the art will recognize and appreciate that it is not so limited. Rather, many additions, deletions, and modifications to the embodiments described herein may be made without departing from the scope of the invention, embodiments of which are hereinafter claimed, including legal equivalents. In addition, features from one disclosed embodiment may be combined with features of another disclosed embodiment while still being encompassed within the scope of the invention as contemplated by the inventor.

What is claimed is:

1. A method of attaching a cutting element to an earth-boring tool, comprising:
    at least partially coating a braze material at an at least substantially uniform thickness onto a tapered surface of a substrate of a cutting element, the tapered surface being defined such that a circumference of the substrate at an interface with a polycrystalline table secured to the substrate is greater than the circumference of the substrate at a back end surface thereof, wherein at least one surface of the braze material exhibits a taper;
    abutting a portion of the braze material against at least one surface of an earth-boring tool, the braze material being located between the cutting element and the at least one surface of the earth-boring tool, a gap being defined between at least another portion of the braze material and at least one adjacent surface of the earth-boring tool, the at least another portion of the braze material being defined by the at least one surface of the braze material exhibiting the taper; and
    brazing the cutting element to the earth-boring tool by applying high-frequency vibrations and ultrasonically torsionally oscillating the cutting element and the braze material to cause the braze material to become flowable.

2. The method of claim 1, wherein ultrasonically torsionally oscillating the cutting element and the braze material comprises ultrasonically oscillating the cutting element and the braze material at a frequency of between about 10 kHz and 100 kHz.

3. The method of claim 1, wherein ultrasonically torsionally oscillating the cutting element and the braze material comprises elevating a temperature of the braze material to a temperature above the liquidus temperature of the braze material.

4. The method of claim 3, wherein elevating the temperature of the braze material to the temperature above the liquidus temperature of the braze material comprises elevating the temperature of the braze material above about 800° F. (427° C.).

5. The method of claim 1, wherein abutting the portion of the braze material against the at least one surface of the earth-boring tool comprises placing the cutting element in a pocket formed in a blade of an earth-boring tool with the braze material adjacent the at least one surface in the pocket.

6. The method of claim 1, wherein ultrasonically brazing the cutting element to the earth-boring tool comprises causing the braze material to flow into the gap.

7. The method of claim 1, further comprising preheating at least a portion of a body of the earth-boring tool to which the cutting element is to be attached to between about 600° C. and about 750° C.

8. The method of claim 1, further comprising completely covering a polycrystalline table secured to an end of the substrate with the braze material.

9. The method of claim 1, wherein the at least partially coating the substrate of the cutting element with the braze material comprises covering a back end surface of the substrate and a portion of a sidewall of the substrate with the braze material.

10. The method of claim 9, further comprising covering at least a polycrystalline table secured to an end of the substrate opposing the back end surface with a protective material.

11. The method of claim 1, wherein the at least partially coating the substrate of the cutting element with the braze material comprises electroplating the braze material onto at least a portion of the substrate.

12. The method of claim 1, wherein ultrasonically torsionally oscillating the cutting element and the braze material comprises ultrasonically torsionally oscillating the cutting element and the braze material at an amplitude of between about 1 μm and about 50 μm, as measured at a periphery of the cutting element and the braze material.

13. The method of claim 1, wherein ultrasonically torsionally oscillating the cutting element and the braze material comprises ultrasonically torsionally oscillating the cutting element and the braze material for a duration of between about 0.1 second and about 60 seconds.

14. A method of securing a cutting element to an earth-boring tool, comprising:
- at least partially coating a braze material at a non-uniform thickness onto a surface of a substrate of a cutting element to form a tapered surface, the tapered surface of the braze material being defined such that a thickness of the braze material proximate a polycrystalline table secured to the substrate is greater than the thickness of the braze material at a back end surface of the substrate;
- at least partially disposing the cutting element in a pocket formed in a body of an earth-boring tool with the braze material adjacent surfaces defining the pocket, the tapered surface of the braze material exhibiting a taper with respect to at least one of the adjacent surfaces defining the pocket to form a gap located between at least a portion of the braze material and the at least one of the adjacent surfaces defining the pocket; and
- ultrasonically torsionally oscillating the cutting element and the braze material to braze the cutting element within the pocket.

* * * * *